UNITED STATES PATENT OFFICE.

JOHN M. MERRYMON, OF LOGANSPORT, ASSIGNOR TO J. M. MERRYMON AND J. H. JORDAN, OF ATTICA, INDIANA.

PAINT COMPOUND.

Specification forming part of Letters Patent No. 19,006, dated December 29, 1857.

*To all whom it may concern:*

Be it known that I, JOHN M. MERRYMON, of the town of Logansport, in the county of Cass and State of Indiana, have invented or discovered a new and useful composition or compound, to be prepared as hereinafter described, to be used as a pigment or paint, either by itself, in combination with oil or oily substances, or mixed with other paints or pigments; and I do hereby declare that the following is a full description of said compound and its mode of preparation.

The essential materials of which this compound is composed are anhydrous or what is commonly known as "unslaked" lime and rosin or gum-turpentine.

The manner in which I usually prepare this compound is as follows: I take a given quantity of quick or unslaked lime—say thirty pounds, or a half-bushel—which I place in a strong vessel of suitable size, to which I add about two and a half to three pounds of common rosin coarsely powdered, (or, if gum-turpentine is used instead of rosin, a somewhat less quantity is used—say about two pounds,) and then pour onto it sufficient of water to cover the whole and something more—say three to four gallons. The water may be either hot or cold, though I prefer it hot and consider it best. The vessel should be sufficiently large. Otherwise the contents, in the process of slaking the lime, will boil up and run over. As soon as the rosin and water have been added the vessel should be covered, to confine the heat and steam arising from the process of slaking, and the action allowed to proceed without disturbance until it ceases, which soon takes place, when the compound will be found in the form of a soft white mass, the rosin during the process having united with the lime. Should more resin than was necessary have been used, the excess will generally be found at the top of the mass. If not enough has been used, a portion of uncombined lime will be found at the bottom. There will also be found settled at the bottom of the vessel more or less crude particles and foreign substances—such as gravel, sand, and the like—that may have been in the lime. The compound, having been thus formed, may now be removed, carefully excluding the crude and uncombined particles, and may be ground, either alone, with the addition of water if it is not soft enough, or with spirits of turpentine, and then dried and pulverized; or it may be immediately ground with oil or mixed with oil, which will cause all the retained water in the compound to separate from it, carrying off with it the excess of alkalinity or causticity, when it is ready for being used as a paint, either by itself or in combination with other paints or colors.

When I wish to produce a very fine article of this compound I first wash it in warm water slightly acidulated with nitric or other suitable acid and allow it to precipitate, after which I carefully pour off the water, when the upper portion of the precipitated mass—say one-fourth of the whole, or more—will be found a most beautiful pure-white pigment, fine enough to be mixed with the finest and most delicate colors. The compound may be washed in water, either with or without acid, until all the soluble lime and causticity have been removed, if desired.

I sometimes, in preparing this compound, add a portion of tallow along with the resin—say one pound (more or less) of tallow to three pounds of resin. I think this best for certain purposes, as I have found that when prepared in this way it forms with oil an excellent waterproof paint, and may be used for painting canvas, canvas bags, and canvas covering for hams, &c., rendering them water-proof and impervious to the atmosphere. When tallow is used it should first be melted with the resin, and the whole, in a melted state, be poured into the vessel immediately after the water has been poured upon the lime. The water in such cases should always be hot. For all ordinary purposes, however, I do not consider the addition of tallow of any essential importance. The compound, I have found, when tallow has been used, requires less oil to render it ready for the brush.

I have said that I usually add the rosin to the lime in a coarse powder. It may be either coarsely or finely powdered, or it may be added in a melted state, in which case the water should be hot and added to the lime first, and the rosin or resin poured on immediately afterward, when the vessel should be covered, as before directed. This compound of lime and resin seems to have lost all the causticity of the original quicklime, and can be mixed with oils like white lead, zinc-white, or any other pigment or painting material, and be used in like manner. It possesses a good body and spreads well under the brush.

One of the remarkable qualities of this compound, in which it differs from white lead and zinc-white, is that it may be mixed with other colors or colored paints or pigments—as red lead, Venetian-red, paris-green, ultramarine, and other colors—in large proportions—say from three to six parts, or even more in some cases, of this compound to one part of the other—without producing an appreciable change in the tone or color of the paint with which it has been mixed, thereby increasing the quantity and capacity of the color or paint to which it has been added in exact proportion to the amount added, and thus becoming practically a substitute for them to that extent when used with them. Having what painters call a "body," equal to most pigments and nearly equal to white lead or zinc-white, it becomes a valuable material for giving body to colors and for increasing their quantity, particularly, as owing to its strong and peculiar neutral quality, it may be used in much larger proportion than either lead or zinc without lightening or affecting the color with which it is mixed. It is therefore not only a valuable substitute for white lead and zinc-white in this respect, but is superior to either of them.

This compound may be mixed with white lead in the proportion of five or six parts to one part of the lead, and form a beautiful white-lead paint, equal in appearance to pure lead, and, in my opinion, much more durable. So it may be mixed with pure zinc-white in a less proportion—say two or three parts to one part of the zinc—and thus form a paint which, to all appearances and for all useful purposes, is equal to the zinc alone. This peculiar property of mixing with other pigments and colors without affecting their color I regard as constituting the great importance and value of this compound. It possesses other valuable properties, however. One is that it improves paints with which it is mixed, giving a better body and rendering them more durable and less affected by the weather. Another is that it seems to require much less oil in proportion to its bulk or quantity than other paints, and hence paints having a large proportion of this compound mixed with them will be found to require much less oil in proportion to the quantity than if the compound was not used. Such, at least, has been my experience.

I have said that in the process of forming this compound the resin will be found to have united with the lime. This is not always strictly true. Sometimes traces of the resin will be seen mixed through the mass in small particles. Where such is the case the resin will all disappear in grinding. It is not possible to prescribe the exact amount of each one of the materials I use in making this compound, because they are not, as commonly found in use, chemically pure. If it should be thought, therefore, that the combination of the lime and resin has not been sufficiently complete from the appearance in the mass of an excess of the resin mixed through it in small lumps, which sometimes happens, owing to an insufficiency of heat having been produced by the slaking of the lime, it may be necessary to submit the mass to a sufficient degree of heat to melt the resin, stirring the compound in the meantime, when the resin will unite with the lime and the water will measurably be driven off. Of course it is presumed that by previous experiment the proper relative proportion of materials shall have been used, as it will be found that lime differs somewhat in its qualities and purity in different localities, and may therefore require different proportions of resin.

Although water is necessary to produce the action and consequent union between the resin and the lime, I am not sure that it enters otherwise than mechanically into the compound when formed. I do not therefore claim it as one of the constituent elements of the compound, but only as a necessary agent.

As it is always advantagous to have a name by which new compositions such as this may readily be designated, I propose to call this compound "silvine," or "silvic white," from one of its constituents, or "neutral white," because of its peculiar property in assimilating with other colors.

What I claim, and desire to secure by Letters Patent, is—

The combination of quicklime and resin for a paint material, substantially in the manner and for the purposes herein set forth.

JOHN M. MERRYMON.

Witnesses:
J. H. JORDAN,
H. KING.